United States Patent [19]

King et al.

[11] Patent Number: 5,818,924
[45] Date of Patent: Oct. 6, 1998

[54] COMBINED KEYPAD AND PROTECTIVE COVER

[75] Inventors: Neal J. King, Oakland; Eli Jacobi, Palo Alto, both of Calif.

[73] Assignee: Siemens Business Communication Systems, Inc., Santa Clara, Calif.

[21] Appl. No.: 691,976

[22] Filed: Aug. 2, 1996

[51] Int. Cl.[6] ........................................ H04M 9/00
[52] U.S. Cl. ...................... 379/389; 379/388; 379/420; 455/575
[58] Field of Search .................... 379/389, 93.19, 379/368, 428, 433, 434, 437, 388, 390, 391, 420, 422, 424; 455/90, 575

[56] References Cited

U.S. PATENT DOCUMENTS

| | | | |
|---|---|---|---|
| 4,763,356 | 8/1988 | Day, Jr. et al. | 379/368 |
| 5,189,632 | 2/1993 | Paajanen et al. | 379/110 |
| 5,257,310 | 10/1993 | Takagi et al. | 379/434 |
| 5,303,291 | 4/1994 | Takagi et al. | 379/434 |
| 5,526,411 | 6/1996 | Krieter | 379/434 |
| 5,625,673 | 4/1997 | Grewe et al. | 455/90 |

*Primary Examiner*—Krista Zele
*Assistant Examiner*—Jacques M. Saint-Surin

[57] ABSTRACT

A mechanical keypad is attached to the outside of a protective cover. A switch allows a personal intelligent communicator to be operated either with the user interface of a mobile telephone handset or with a graphical user interface. When the cover is closed, the mechanical keypad serves for dialing telephone numbers. When the cover is open, the mechanical keypad is disabled, and the graphical user interface is revealed. The microphone and speaker of the personal intelligent communicator together operate as a speaker phone when the cover is open, and as a mobile telephone handset when the cover is closed. By use of an override switch, the personal intelligent communicator can also operate as a speaker phone when the cover is open.

8 Claims, 3 Drawing Sheets

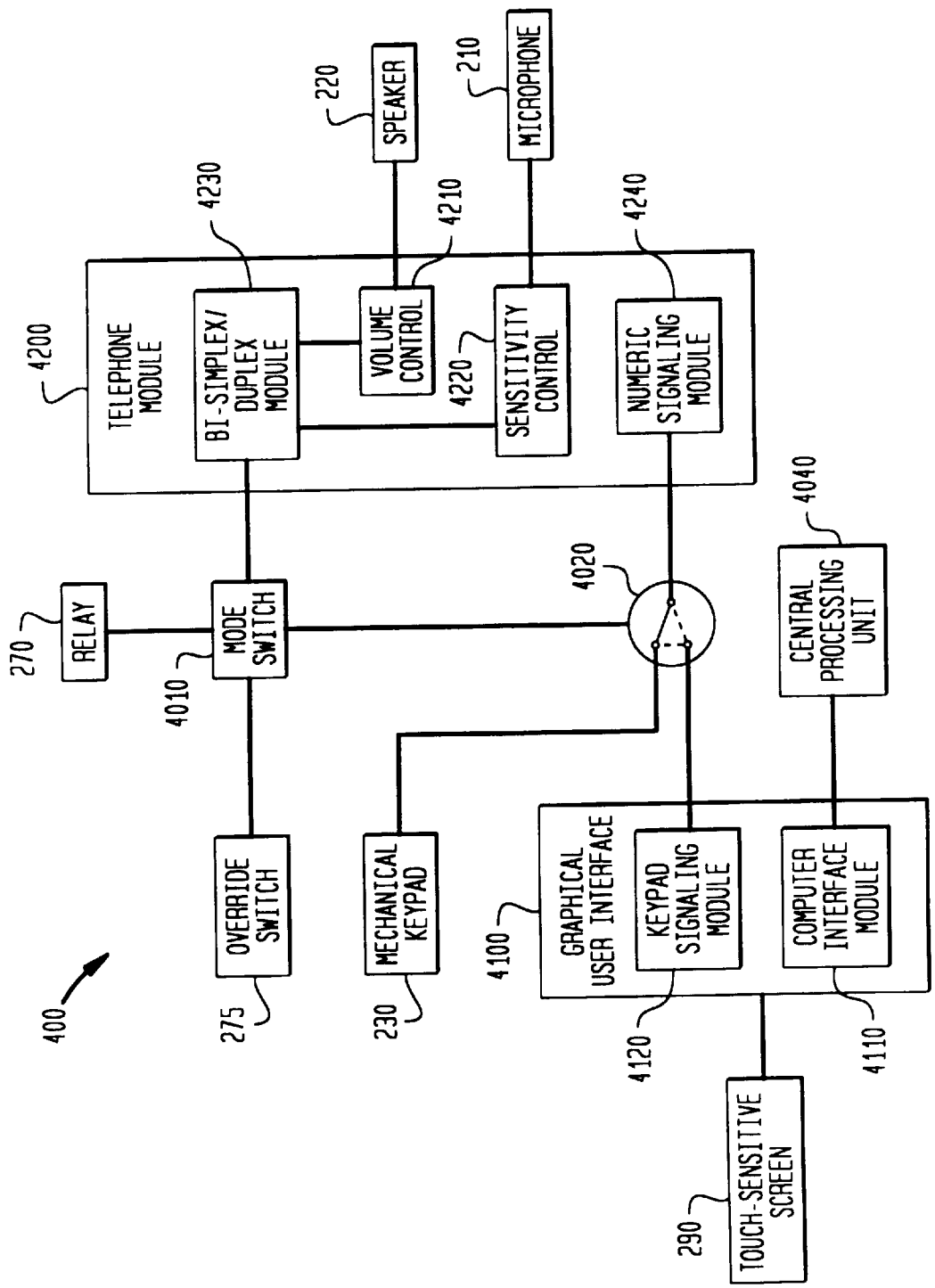

COMBINED KEYPAD AND PROTECTIVE COVER

TECHNICAL FIELD OF THE INVENTION

The present invention relates to personal intelligent communicators and telephonic devices.

BACKGROUND OF THE INVENTION

Personal intelligent communicators are small devices, typically smaller than a notebook computer, which store personal information and also serve as an interface to communications. Personal intelligent communicators typically include a means for data input; data processing means; display; and telecommunications capabilities. The data input typically includes allowing the user to dial a telephone number.

Personal intelligent communicators (PICs) commonly have touch-sensitive displays, or pressure-sensitive screens such as are used in pen-based computers. Such a display or screen offers a graphical user interface that allows the user to invoke and direct the information processing capabilities of the PIC, and to input information by a simulated keypad. The simulated keypad is not necessarily always present, but appears in particular modes of operation of the PIC. When the keypad is simulated, an image of a numerical keypad or alphabetical typewriter key layout appears on the screen. In these modes, a touch on the screen by a finger or a hard object such as a stylus, at the image of a key or button, results in the corresponding number or letter being input to the PIC.

In the background art, the PIC uses such a touch-sensitive screen not only to input information to the information processing capabilities of the PIC, but also to invoke the telecommunications capabilities of the PIC, such as initiating a telephone call or facsimile call. Commonly, in the telecommunications mode of the PIC, the simulated keypad resembles, or includes the semblance of, the 12-key alphanumeric keypad of a normal push-button telephone. Also commonly, when the telephone function of the PIC is used, it operates as a speaker phone, with the face of the user at a distance from the PIC.

The above-described approach has the disadvantage that the dialing of a telephone number on a touch-sensitive screen feels unfamiliar to a user accustomed to using a mechanical keypad, so that the user is likely to make mistakes if dialing quickly. There is no tactile clue if the user's finger slips from the digit he intends to dial, or if his finger is pressing on two digits simultaneously. Furthermore, the telephone function can be used only in circumstances in which the fragile touch-sensitive screen can be safely exposed. In many situations, as for example in many work situations, it may be risky to expose the screen for fear that it may be broken. The uniformity of feel of the touch screen makes it difficult for users with any impairment, permanent or temporary, of tactile sensation. The elderly and people with arthritis or other conditions can have trouble using touch screens, as can users whose fingers are stiff from exposure to cold or who are wearing gloves.

In addition, the privacy of the telephone function is limited, since the PIC can only be used as a speaker phone: it cannot be held up to the mouth and ear, as can a mobile phone, further limiting the number of situations where it operates effectively. As a speaker phone, it transmits background noise to the other party of the call; and it operates in a bi-simplex mode, with only one party able to speak at a time. This last limitation means that control of the speech path is determined by whoever speaks loudest, so that users often end up shouting at each other in order to conduct the conversation.

What is needed is a device that allows use of the information processing capabilities of the PIC under a broader range of circumstances and that offers more privacy and convenience than a speaker phone.

SUMMARY OF THE INVENTION

The present invention includes an apparatus and method which allow a personal intelligent communicator to operate in two modes. In one mode, the device offers the user interface of a mobile telephone; in the other mode, it offers a graphical user interface.

In particular, an embodiment of the present invention comprises a mechanical keypad mounted on the outside of a protective cover; and a switch controlling the mode of operation of the personal intelligent communicator (PIC). When the cover is closed, the PIC operates as a mobile telephone handset, allowing dialing by means of the mechanical keypad, and hearing and speaking by holding the PIC close to the ear and mouth of the user. When the cover is open, the mechanical keypad is disabled; the PIC can be controlled by a graphical user interface comprised of a graphical display and a touch-sensitive screen; and conversation is conducted by using the PIC as a speaker phone.

BRIEF DESCRIPTION OF THE FIGURE

FIG. 4 shows a block diagram of an embodiment of the present invention.

DETAILED DESCRIPTION OF THE PREFERRED EMBODIMENTS

Figure 1:
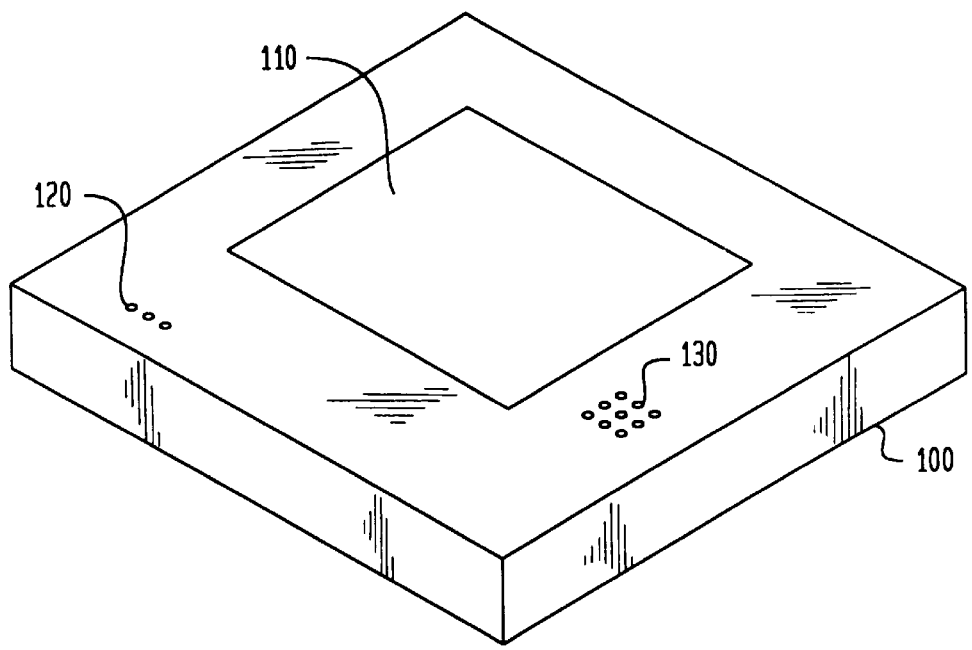
FIG. 1 shows a representation of a personal intelligent communicator (PIC) with a graphical user interface.

FIG. 1 shows a personal intelligent communicator of the background art. As shown in FIG. 1, the personal intelligent communicator (PIC) 100 possesses a touch-sensitive screen 110, a microphone 120, and a speaker 130. The touch-sensitive screen serves as a graphical display and an input device for the PIC, providing an address-book capability. The microphone and speaker together provide speakerphone operation during telephone calls. The full scope of capabilities of the PIC includes facsimile, electronic mail, and Internet access, in addition to telephone calls.

Figure 2:
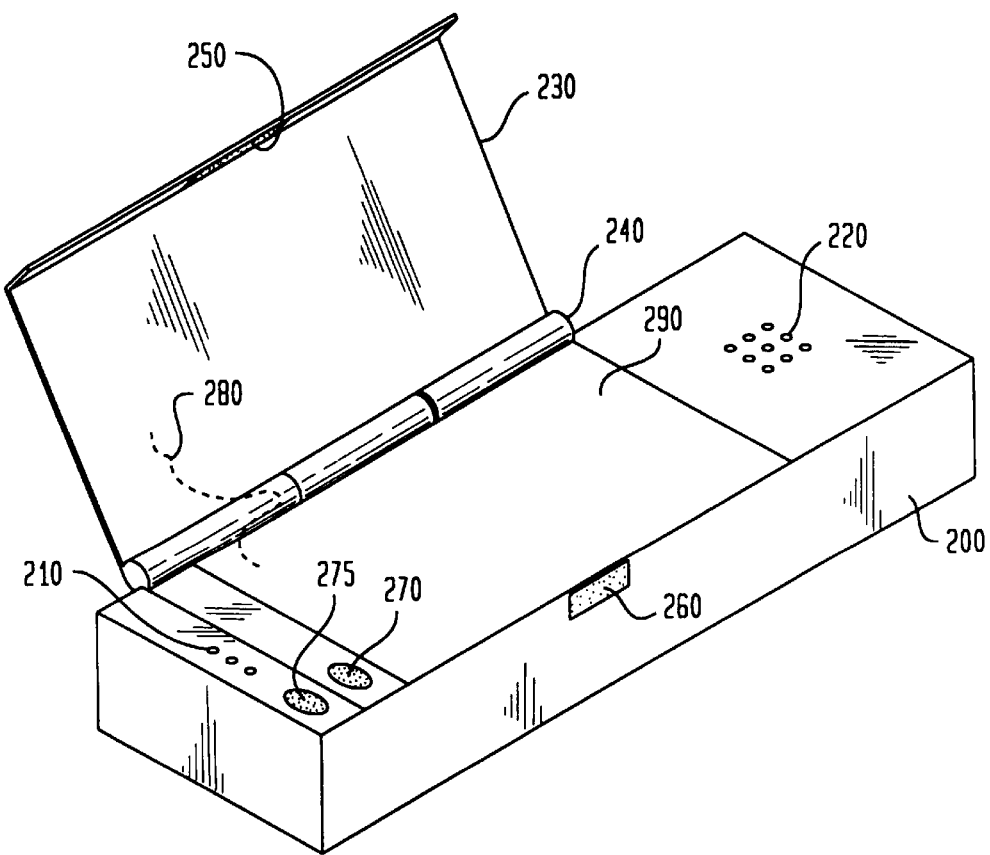
FIG. 2 shows a PIC with a combined keypad and protective cover, in open position, in accordance with the preferred embodiment.

FIG. 2 shows a PIC with combined keyboard and protective cover, in accordance with the present invention, in open position. As shown in FIG. 2, in a preferred embodiment of the present invention, a PIC 200 has a touch-sensitive screen 290, a microphone 210 and a speaker 220, which provide the same functions described for FIG. 1 in the paragraph above. Additionally, a combined keyboard and protective cover 230 is attached to the body of the PIC by a hinge 240. A clasp 250 on the protective cover is designed to grasp onto the indentation 260 on the body of the PIC, to keep the cover closed when it is shut. A mechanical relay 270 is placed so that it is open when the cover is open, and closed when the cover is closed. When the relay is open, as shown, the PIC is placed in "speaker-phone mode," in which the speaker volume and microphone sensitivity are appropriate to a speaker phone. Another switch 275 allows the user to override the relay, so that the PIC can be placed in speaker-phone mode even when the cover is closed. A control interface, such as shown in FIG. 2 as an electrical wire 280, connects the keyboard to the input interface of the PIC. In a preferred embodiment, the wire is hidden within the interior structure of the cover and enters the interior of the PIC through the structure of the hinge.

Figure 3:
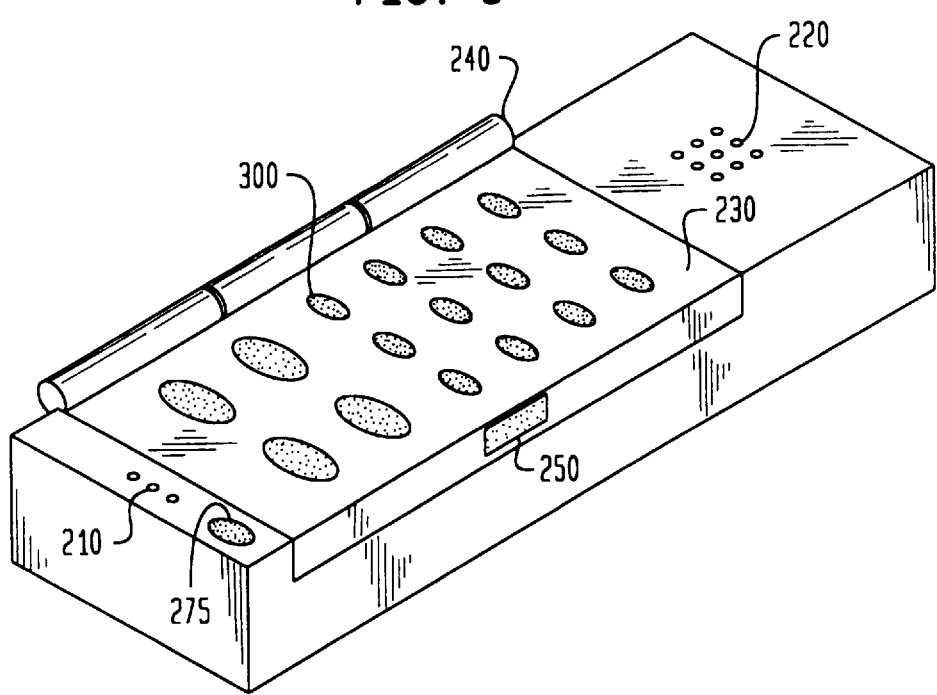
FIG. 3 shows the device of FIG. 2, in closed position.

FIG. 3 shows the device of FIG. 2 in closed position. As shown in FIG. 3, the speaker 210, the microphone 220, the hinge 240, the clasp 250, and the override switch 275 are still visible, but the touch-sensitive screen is covered by the combined keyboard and protective cover 230, now seen from above. In a preferred embodiment, the PIC has the form factor of a mobile telephone handset, with the microphone and speaker in positions appropriate to such a mobile telephone handset. In a preferred embodiment, the keyboard consists of individual keys or buttons, the surfaces of which are rubberized to provide friction to the fingers. With the cover closed, the relay, now covered, is closed, placing the PIC in "handset mode," in which the volume of the speaker and the sensitivity of the microphone are appropriate to a normal mobile phone.

FIG. 4 shows a block diagram of a system 400 in accordance with the present invention. In addition to previously defined parts, including override switch 275 connected to a mode switch 4010, the diagram shows a module 4200 of the PIC, which is dedicated to telephone functions; the graphical user interface equipment 4100 of the PIC; the central processing unit 4040 of the PIC; and mode switch 4010 connected to the relay 270. Within the graphical user interface is a computer interface module 4110, which allows the user to access the information processing capability of the central processing unit; and the keypad signaling module 4120, which accepts alphanumeric input from the touch-sensitive screen. Within the telephone module is a bi-simplex/duplex module 4230 connected to the mode switch; a volume control 4210 that controls the sound volume of the speaker; a sensitivity control 4220 that controls the sensitivity of the microphone; and a numeric signaling module 4240 that is connected to the switch. Those of ordinary skill in the art will recognize the separate sub-modules of the telephone module as major components of a speaker phone.

In accordance with the present invention, the relay controls the mode switch: when the relay is closed, corresponding to the lid being closed, the mode switch is in "handset" state; when the relay is open, corresponding to the lid being open, the mode switch is in "speaker phone" state. The override switch, however, allows the user to place the mode switch in speaker-phone state even if the relay is closed.

When the mode switch is in the handset state, the switch connects a control path from the mechanical keypad to the numeric signaling module. By means of this connection, the keypad can be used for dialing and other numeric input functions normal to a push-button telephone. Additionally, in the handset state, by means of a control path from mode switch to the bi-simplex/duplex module, the bi-simplex/duplex module is put in "duplex" mode. In duplex mode, the volume control is set, by the bi-simplex/duplex module, to maintain the speaker volume level of the speaker at the level VC appropriate to a mobile telephone handset; and the sensitivity control is set, by the bi-simplex/duplex module, to maintain the sensitivity of the microphone at the level SC appropriate to a mobile telephone handset: the speaker and the microphone are allowed to operate simultaneously.

When the mode switch is in speaker-phone state, the switch connects a control path from the keypad signaling module to the numeric signaling module. By means of this connection, the touch-sensitive screen can be used for dialing and other numeric input functions normal to a push-button telephone. Additionally, in the speaker-phone state, by means of a control path from the mode switch to the simplex/duplex module, the bi-simplex/duplex module is put in "bi-simplex" mode. In bi-simplex mode, the volume control is set to maintain the volume level of the speaker to the level VO appropriate to a normal speaker phone; and the sensitivity control is set to maintain the sensitivity of the microphone to the level SO appropriate to a normal speaker phone: the speaker and the microphone coordinate their operation in a manner appropriate to a speaker phone. As one particular example of an appropriate manner of coordination: only one of the speaker and microphone may be allowed to operate at one time; operational ability can be taken from one system and given to the other by the reception of a stronger than usual voice signal. These manners of coordinating speaking and hearing for speaker phones are well known to those of ordinary skill in the art.

In an alternative preferred embodiment, the speaker and microphone functions can be provided by a headset, with earphones and a microphone mounted near the mouth of the user. FIG. 1 would then be modified by the insertion of the headset, a jack on the PIC, and an electrical cord plugged into the jack and connected to the headset. FIG. 4 would still apply, but the bi-simplex/duplex module would be absent; and the mode switch will not control the volume control or the sensitivity control, because the speaker and microphone attributes will not depend on whether the PIC is open or closed. In a preferred embodiment, the cable and relay together can be replaced by, for example, a light-emitting diode and photocell pair, such that when the cover is closed, the unbroken optical link between the pair maintains the mode switch in closed state; and when the lid is open, the broken optical link between the pair maintains the mode switch 4010 in open state.

The ruggedized touch-screen cover with keypad provides versatile use. For example, a user can clip the PIC to a belt and wear it without fear of cracking or breaking the touch screen. The tactile familiarity of the keypad increases the flexibility and ease of use of the device.

Those skilled in the art will recognize that the foregoing description has been presented for the sake of illustration and description only. As such, it is not intended to be exhaustive or to limit the invention to the precise form disclosed. Modifications and variations are possible in light of the above teaching that are considered to be within the spirit of the present invention. In particular, the invention includes (but is not limited to) the following variations.

The sensitivity levels SC and SO and the volume levels VC and VO can be separately and individually modified by user-controlled settings. The mode switch may be used to power on and off the non-telephone functions of the PIC, such as the central processing unit and the graphical user interface equipment. In closed state the power will be off, in open state, the power will be on. The positions of the speaker, microphone, and override switch may be moved to various positions on the PIC. The mechanical keypad may be integral to, embedded in, or attached to the protective cover. The mechanical keypad may consist of individual buttons, or may be sealed over to make an unbroken surface. The mechanical keypad may be on the inside of the protective cover.

The clasp and indentation can be replaced by another means of securing the closure of the cover. The relay may be replaced by any means by which the closure of the cover is determined. The signaling and control connections, shown as cable and others implied in the block diagram FIG. 4, may be made using various technologies, including electromagnetic (e.g., optical, infrared, radio) as well as electrical. The different functional modules of FIG. 4 may be implemented in equipment in various ways, using different combinations of microprocessors.

What is claimed is:

1. A personal communications device comprising a touch screen;

a data processor;

telecommunications capabilities including a telephone;

a cover that fits over the touch screen, said cover having a bottom surface and a top surface, said bottom surface being adjacent to said touch screen and said top surface including a keypad, wherein when said cover is closed, said touch screen is entirely covered by said cover, and said keypad is operable to dial said telephone.

2. A personal communications device as in claim 1, in which said keypad further comprises means for inputting data.

3. A personal communications device as in claim 1, in which said telecommunications apparatus includes facsimile capabilities.

4. A method of operating a personal intelligent communicator, said personal intelligent communicator comprising a touch screen, a data processor, a telephone, a cover that opens and closes to expose and entirely cover, respectively, the touch screen, and a bi-simplex-duplex module for changing the operation of said telephone, said method comprising the steps of:

when said cover is open and said touch screen is exposed, operating said telephone in a speaker phone state; and when said cover is closed and said touch screen is covered, operating said telephone in a handset state.

5. A method of operating a personal intelligent communicator, said personal intelligent communicator comprising a touch screen, a data processor, a telephone, a cover that opens and closes to expose and entirely cover, respectively, the touch screen, and a bi-simplex-duplex module for changing the operation of said telephone, said method comprising the steps of:

when said cover is open and said touch screen is exposed, operating said telephone in a speaker phone state; and when said cover is closed and said touch screen is covered, operating said telephone in a handset state, wherein when said telephone is in said speaker phone state, the following steps are performed:

connecting, by a mode switch, a control path from a keypad signaling module to a numeric signaling module, whereby the touch-sensitive screen can be used for numeric input functions including dialing the telephone;

switching, by said mode switch, said bi-simplex-duplex module to bi-simplex operation; and switching, by said mode switch, from a keypad signaling module to a numeric signaling module.

6. The method of claim 5 wherein when said mode switch switches said bi-simplex-duplex module to bi-simplex mode, speaker volume control and microphone sensitivity are set to predetermined levels.

7. The method of claim 5 wherein, when said telephone is in said handset state, the following steps are performed:

connecting, by a mode switch, a control path from the keypad to a numeric signaling module, whereby the keypad can be used for numeric input functions including dialing the telephone; and switching, by said mode switch, said bi-simplex-duplex module to duplex operation.

8. The method of claim 7 wherein when said mode switch switches said bi-simplex-duplex module to duplex mode, speaker volume control and microphone sensitivity are set to predetermined levels.

\* \* \* \* \*